United States Patent
Kitamura

(10) Patent No.: US 6,223,093 B1
(45) Date of Patent: Apr. 24, 2001

(54) SYSTEM AND METHOD FOR VERIFYING PROCESS PROCEDURES IN A MANUFACTURING ENVIRONMENT

(75) Inventor: Mitsuyoshi Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/871,196

(22) Filed: Jun. 9, 1997

(30) Foreign Application Priority Data

Jun. 7, 1996 (JP) ................................................. 8-168287

(51) Int. Cl.⁷ ......................................................... G06F 19/00
(52) U.S. Cl. ............................................. 700/104; 700/121
(58) Field of Search ........................ 364/468.01, 468.02, 364/468.1, 29.832; 700/95, 104, 102, 100, 121

(56) References Cited

U.S. PATENT DOCUMENTS

| | | | |
|---|---|---|---|
| 5,321,885 | * 6/1994 | Hino et al. ............................... | 29/832 |
| 5,442,731 | * 8/1995 | Tanaka et al. ........................... | 395/54 |
| 5,488,732 | * 1/1996 | Ryu et al. ............................... | 395/800 |
| 5,495,417 | * 2/1996 | Fuduka et al. ........................... | 700/95 |
| 5,764,513 | * 6/1998 | Toyota ................................. | 364/468.01 |

\* cited by examiner

*Primary Examiner*—Albert Decady
*Assistant Examiner*—Shelly A Chase
(74) *Attorney, Agent, or Firm*—Ostrolenk, Faber, Gerb & Soffen, LLP

(57) ABSTRACT

In a process procedure verifying system for the manufacturing of a semiconductor device, a process procedure inputted through an input and display device and stored in a temporary memory, is verified by using a knowledge data prepared on the basis of data stored in a product information memory and an equipment information memory. Thus, the process procedure can be verified with no intervention of experience and perception of a human being, and without concentrating a load to a limited equipment, with the result that production efficiency and reliability can be elevated.

9 Claims, 12 Drawing Sheets

Fig. 6

| CURRENT PROCESS CODE \ NEXT PROCESS CODE | A01A01 | A01A03 | ... | USE CONDITION CODE |
|---|---|---|---|---|
| A01A01 | × | ○ | ... | I020003,I010001 |
| A01A03 | ○ | × | ... | E010034 |
| B01C04 | ○ | — | ... | F030004 |
| B02D65 | ○ | — | ... | T460045,T470082 |
| ... | ... | ... | ... | ... |

| EQUIPMENT NO.<br>EQUIPMENT GROUP CODE | 01 | 02 | 03 | ... | ADDING VALUE |
|---|---|---|---|---|---|
| E01 | 125 | 21 | — | ... | 5 |
| F01 | 65 | 82 | 73 | ... | 10 |
| F03 | 21 | 22 | 83 | ... | 7 |
| D45 | 12 | 11 | — | ... | 4 |
| ... | ... | ... | ... | ... | ... |

| CONDITION CODE \ EQUIPMENT NO. | 01 | 02 | 03 | WORKING CONTENT | 402 |
|---|---|---|---|---|---|
| 0001 | O | O | O | A | |
| 0002 | O | — | O | A | |
| 0003 | — | O | O | A | |

BBB0001 → BBB0003

| EQUIPMENT CODE \ EQUIPMENT NO. | 01 | 02 | 03 | ADDING VALUE | 701 |
|---|---|---|---|---|---|
| BBB | 50 | 10 | 10 | 10 | |

⇒

(B)

| EQUIPMENT CODE \ EQUIPMENT NO. | 01 | 02 | 03 | ADDING VALUE | 701 |
|---|---|---|---|---|---|
| BBB | 50 | 15 | 15 | 10 | |

SYSTEM AND METHOD FOR VERIFYING PROCESS PROCEDURES IN A MANUFACTURING ENVIRONMENT

BACKGROUND OF THE INVENTION

1. Field of the Invention

The present invention relates to a process procedure verifying system, and more specifically to a process procedure verifying system which is suitable for verifying the procedure of processes for manufacturing a semiconductor device, and which is intended to verify a prepared process procedure by using, as a knowledge base, data for process procedures being used, and by additionally considering the condition of a production line, when a product is manufactured by performing a plurality of predetermined processes in a predetermined sequence.

2. Description of Related Art

Now, a prior art process procedure verifying method will be described with reference to the flow chart of FIG. 1. In case of manufacturing a semiconductor device by carrying out a plurality of predetermined processes in accordance with a predetermined flow, a desired working process and a desired working condition are picked up from working processes and working conditions stored as data, and the picked-up working process and working condition are paired (step 101).

Then, the working processes each paired with the working condition, are arranged in a working sequence, to prepare a process procedure (step 102).

Next, the process procedure prepared in the above steps is checked (step 103). This checking is carried out by representing a surface condition (resist deposition, wafer exposure, etc.) of a wafer used for manufacturing the semiconductor device, by a plurality of different colors, and by observing the arrangement and the superposition of the colors in order to check whether or not there is a problem and to make modification if there is a problem (steps 103 and 104).

Thereafter, processing equipment used in the process procedure prepared in the above mentioned steps are counted, and a necessary equipment capability is calculated for each equipment group (step 105).

Then, the calculated result is added to the amount of use of a current production line (step 106), and whether or not the result of the addition exceeds the capability of the equipment is checked (step 107).

When the result of the checking in the step 107 indicates that there is a problem, a countermeasure such as an increase of the equipment capability and addition of the equipment is taken (step 108).

On the other hand, when the result of the checking in the step 107 indicates that there is no problem, or when the necessary countermeasure has been taken, the manufacturing is executed by using the obtained process procedure (step 109).

However, the above mentioned prior art process procedure verifying method includes a judgment by a human being, and therefore, it is a problem that the degree of precision in the judgment depends upon experience and perception of a skilled person.

Therefore, it is not easy to increase the number of operators capable of performing this process procedure verification, and accordingly, this verification work is loaded onto limited persons (skilled persons), with the result that a long time is required to complete the work, and it becomes an obstruction in elevating work efficiency. Therefore, a problem occurs in which a start of various experiments and manufacturing in order to produce a new product is delayed.

In addition, the above problem has become more serious because of the inclination of a many-kind, few-production in the semiconductor device.

Another problem is that because the experiments rely on the perception of a human being, the result is different from one operator to another and therefore never becomes constant. A further problem that there is possibility that because of a human-caused error, such as a misjudgment which is unavoidable because of a human's work, a product is produced with a problem existing in the process procedure.

In this case, since the semiconductor device is produced in a job-shop flow, when a product concerning a problematic process procedure is processed in an equipment and the equipment is contaminated as a result, if the contamination remains undiscovered and another product is processed in the contaminated equipment, the another product is also contaminated and therefore becomes defective. As such, there is a problem that not only the first product itself, but also subsequent products are adversely influenced.

On the other hand, when a process procedure for a new product is prepared, there is an inclination that a designer adds many measuring steps and inspecting steps, from the viewpoint of taking safety of the product into consideration to the utmost, and limits the working equipment in order to cause the work to be carried out in an equipment having a good performance.

In the above mentioned case, since no trouble occurs in the process procedure, the prepared process procedure will pass, with no problem, the checking by a person who checks the process procedure. Therefore, when the necessary equipment capability is calculated, the work is concentrated to limited equipment, with the result that there occurs such a problem that the working period for manufacturing the product becomes long and the equipment investment increases.

In connection with this kind of technology as mentioned above, for example, Japanese Patent Application Pre-examination Publication No. JP-A-02-162463 proposes a system for supporting a preparation of a process network for representing the procedure of works and actions, and Japanese Patent Application Pre-examination Publication No. JP-A-02-130678 proposes a manufacturing plan preparing system for automatically preparing the execution sequence of jobs in order to elevate the production efficiency.

In brief, JP-A-02-162463 proposes a process network preparation supporting system of replacing the processes by networks and preparing the process procedure having no contradiction. This process network preparation supporting system is surely effective in the job-flow type manufacturing process, typified by an assembling operation, but has not yet solved the above mentioned problems in the job-shop type manufacturing process such as semiconductor device manufacturing, since the same product is processed many times in the same equipment.

On the other hand, JP-A-02-130678 proposes a method for efficiently executing the manufacturing work by using a simulation technology in the manufacturing plan preparing system for automatically preparing the execution sequence of jobs in order to elevate the production efficiency. This method makes it possible only to cope with the concentration of products to be processed, by efficiently utilizing the capability of the equipment. However, the problems has not yet been solved.

SUMMARY OF THE INVENTION

Accordingly, it is an object of the present invention to provide a process procedure verifying system which has overcome the above mentioned problems of the prior art.

Another object of the present invention is to provide a process procedure verifying system capable of elevating reliability in product manufacturing by verifying the process procedure and by modifying a problematic portion, with no intervention of the experience and the perception of a human being, and capable of elevating the productivity by reducing the load of each manufacturing equipment.

In order to achieve the above mentioned objects, the process procedure verifying system in accordance with the present invention includes means for storing information data concerning the process procedure and the working conditions of a product being manufactured in a production line, means for generating, on the basis of the stored information data, knowledge data for verifying a process procedure, means for storing the condition of equipment groups in the production line, means for verifying a process procedure prepared by using the stored condition in the production line, and means for modifying a problem in the process procedure, on the basis of the verification result and the knowledge data.

Alternatively, in a system for manufacturing a product by performing a plurality of predetermined processes in accordance with a predetermined flow, the system includes means for storing equipment information including the working situation and the capability of equipment in a production line, means for storing product information including the working situation of a product, the work-in-progress situation, and the process procedure and the working condition of the product being manufactured in the production line, and means for controlling the product being manufactured in the production line, by using these storing means. The process procedure verifying system in accordance with the present invention further comprises means for generating a knowledge data by using the process procedure and the working condition stored in the means for storing the product information, input means for inputting product information including the process procedure and the working condition, temporary storing means for temporarily storing data inputted through the input means, verifying means for verifying newly inputted data on the basis of the temporary storing means and the knowledge data generated by the means for generating the knowledge data, modifying means for retrieving a problem on the basis of the result of the verification performed by the verifying means and for modifying the found-out problem, means for temporarily storing the modified data, and means for transferring the modified data to the means for storing the production information.

With the above mentioned arrangement, according to the present invention, the knowledge data is generated on the basis of the product data of the product which is actually produced in a production line, and the process procedure is verified by using the knowledge data thus generated. Therefore, since there is no intervention of experiments and perception of a human being, a constant and stable result of verification can be obtained. In addition, since the intervention of experiments and perception of a human being are no longer necessary, anyone can carry out the verification and can obtain the result in a short time.

BRIEF DESCRIPTION OF THE DRAWINGS

FIG. 6 illustrates one example of the data structure in a knowledge data memory in the first embodiment of the present invention;

FIG. 7 also illustrates one example of the data structure in a knowledge data memory in the first embodiment of the present invention;

FIG. 10 also illustrates one example of the knowledge data at the time of verifying the equipment load, in the first embodiment of the present invention;

DESCRIPTION OF THE PREFERRED EMBODIMENTS

Now, embodiments of the process procedure verifying system in accordance with the present invention will be described with reference to the accompanying drawings.

Figure 1:
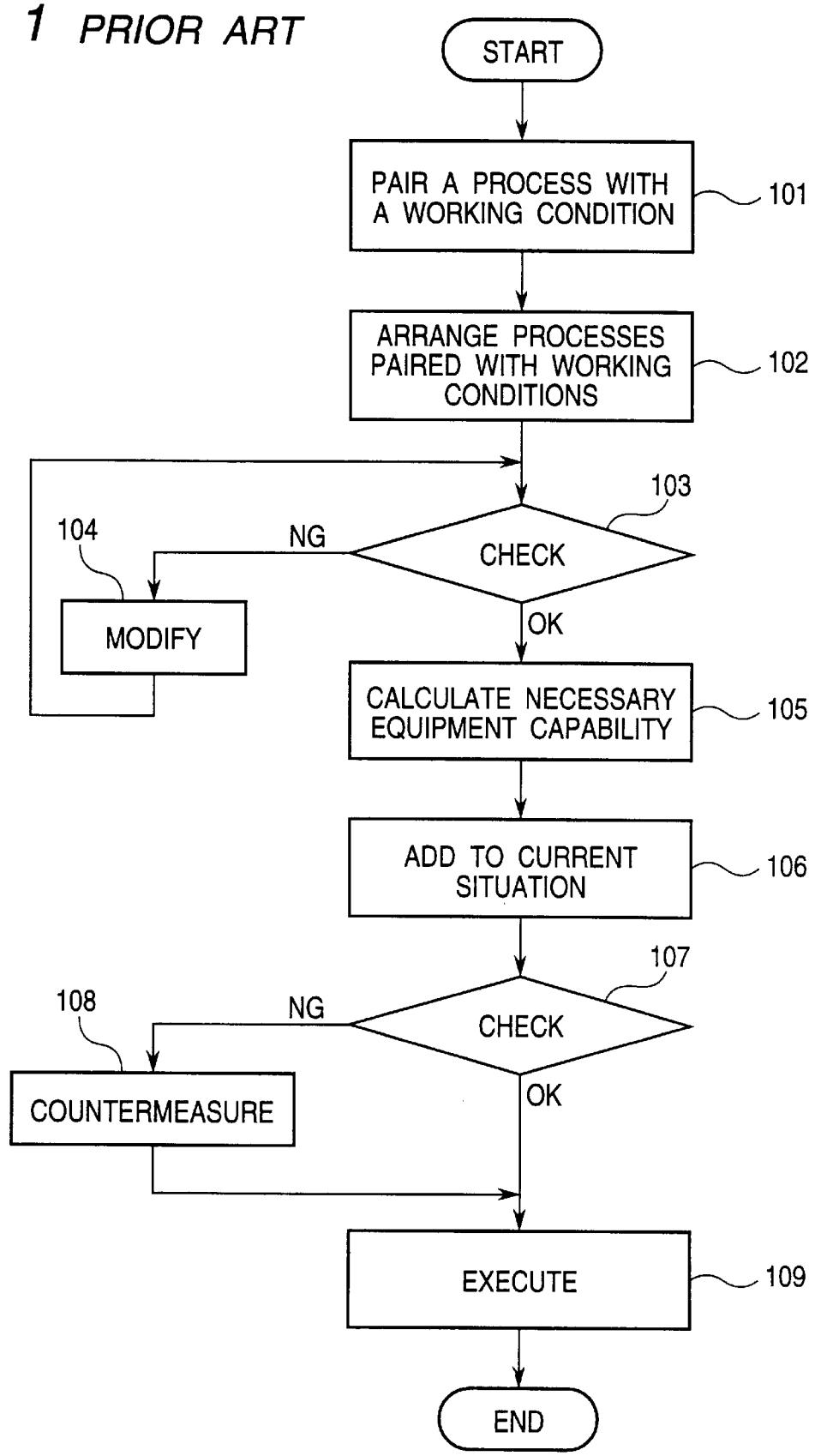
FIG. 1 is a flow chart illustrating the processing in the prior art.
Figure 2:
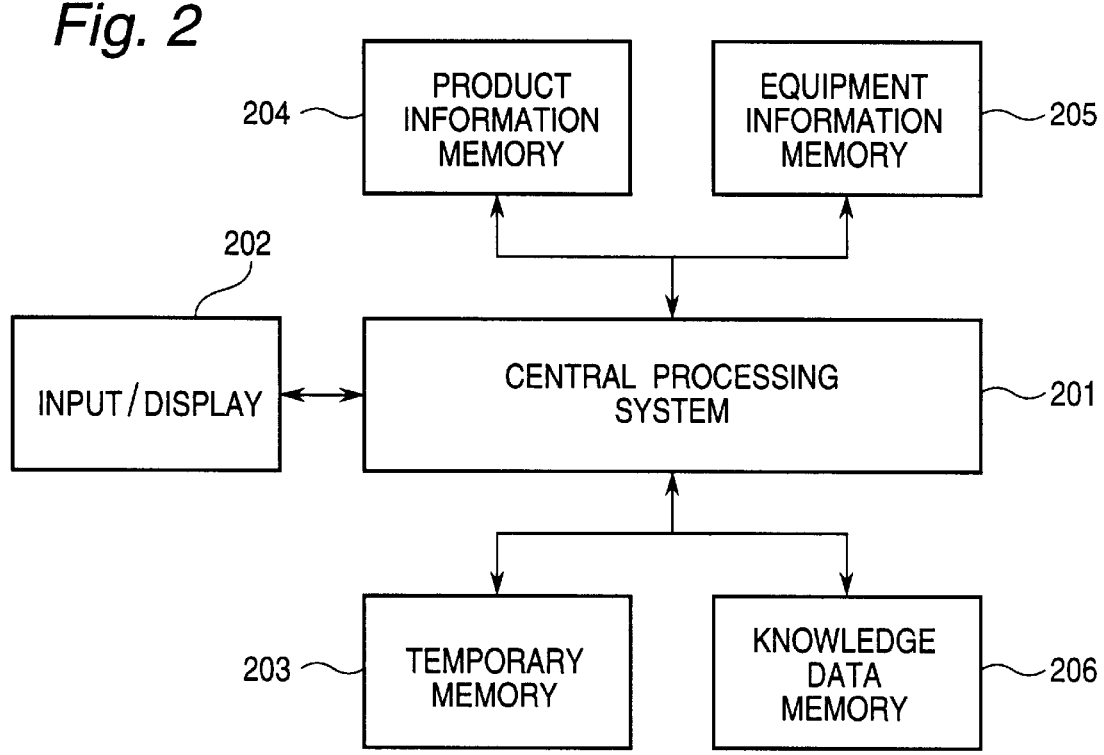
FIG. 2 is a block diagram illustrating the construction of a first embodiment of the present invention.

FIG. 2 is a diagram illustrating the construction of a first embodiment of the present invention. Referring to FIG. 2, the first embodiment includes a central processing system 201, an input and display system 202 for inputting the process procedure data and other data and for displaying the result, a temporary memory 203 for temporarily storing the data inputted through the input and display system 202, a product information memory 204 for storing a working procedure and a working condition for each product, an equipment information memory 205 for storing the number of pieces of equipment in the production line and the working history of the equipment, and a knowledge data memory 206 for storing the knowledge data obtained from the product information memory 204 and the equipment information memory 205. The input and display system 202, the temporary memory 203, the product information memory 204, the equipment information memory 205, and the knowledge data memory 206 are connected to the central processing system 201.

Now, information stored in various memories will be described.

Figure 3:
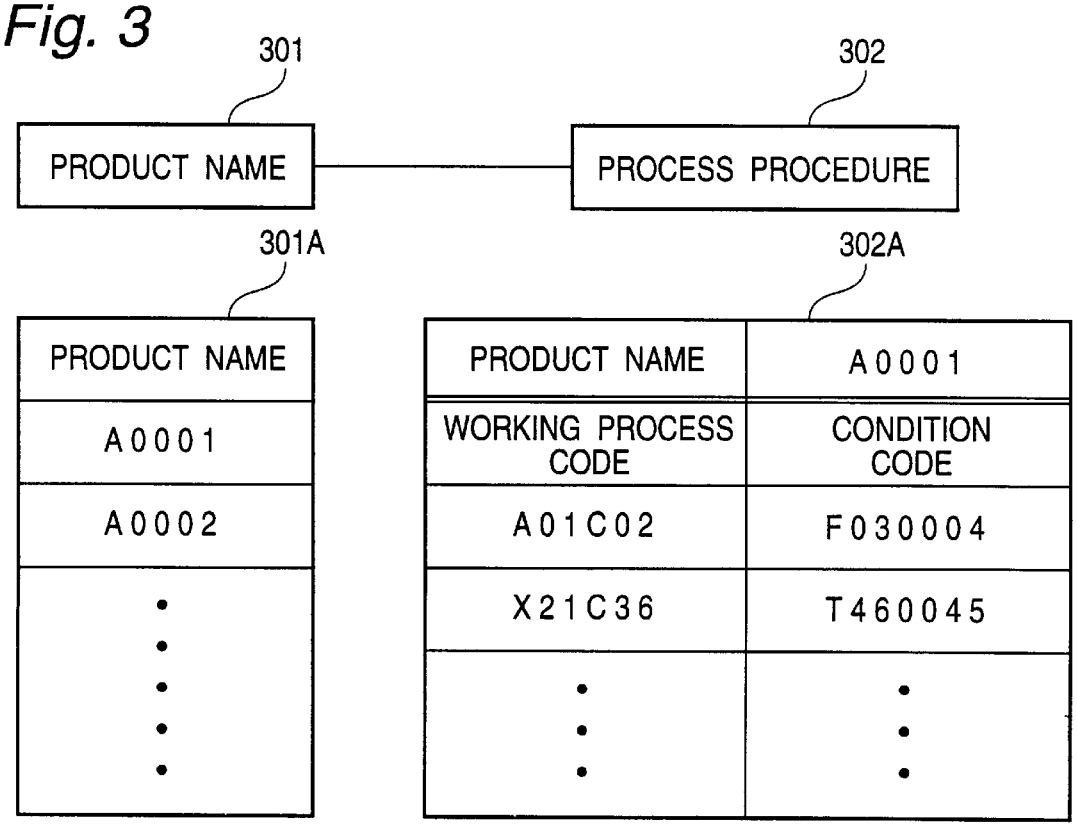
FIG. 3 illustrates one example of the data structure in a product information memory in the first embodiment of the present invention.

FIG. 3 illustrates one example of the structure of information stored in the product information memory 204.

Referring to FIG. 3, in the product information memory 204, a product name data base 301, 301A storing the name of products being produced in the production line, is linked with a process procedure data base 302 storing the process procedures for each individual product name. In the process procedure data base 302, working process names and working conditions are stored in the order of the workings, in the form converted into working process codes and condition codes (302A). For example, the condition code of the working process code A01C02 of the product name A0001 is F030004, and the next working process has the code X21C36 and the condition code T460045.

Figure 4:
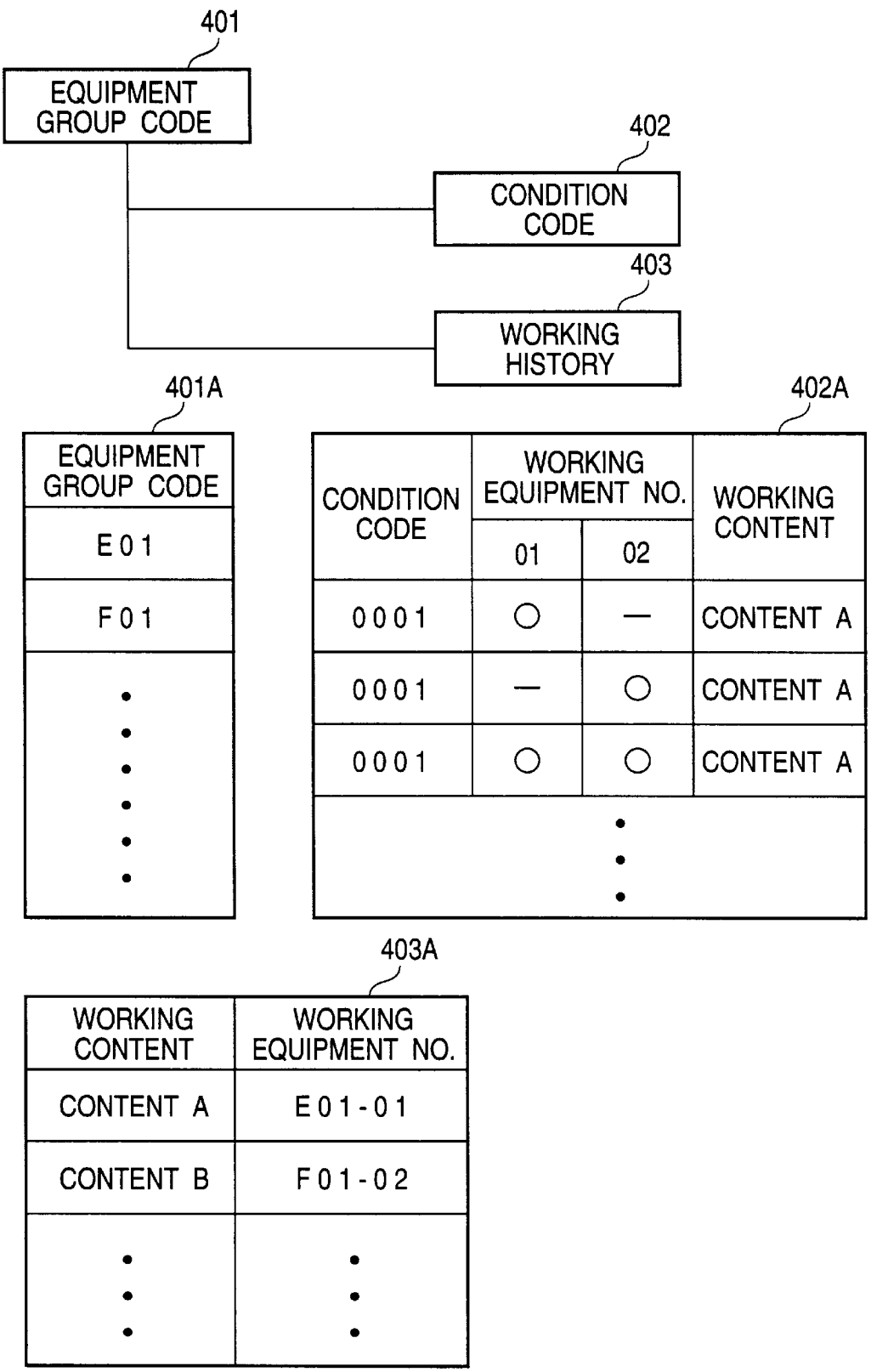
FIG. 4 illustrates one example of the data structure in an equipment information memory in the first embodiment of the present invention.

FIG. 4 illustrates one example of the structure of information stored in the equipment information memory 205.

Referring to FIG. 4, an equipment group code data base 401, 401A prepared by grouping the same processing equipment, is linked with a condition code data base 402, 402A storing the content of the processing and the equipment number(s) of the equipment capable of executing the processing, for each equipment group code, and is also linked with a working history data base 403, 403A storing, for each working, the equipment number(s) of the equipment(s) capable of executing the work. An entry of the condition code data base 402 includes, for each condition code, a field for storing the equipment number of the equipment capable of executing the processing (if execution is possible, ○ is marked) and a field for storing the working content. An entry of the working history data base 403 includes a field for storing the working content and a field for storing the working equipment number.

Figure 5:
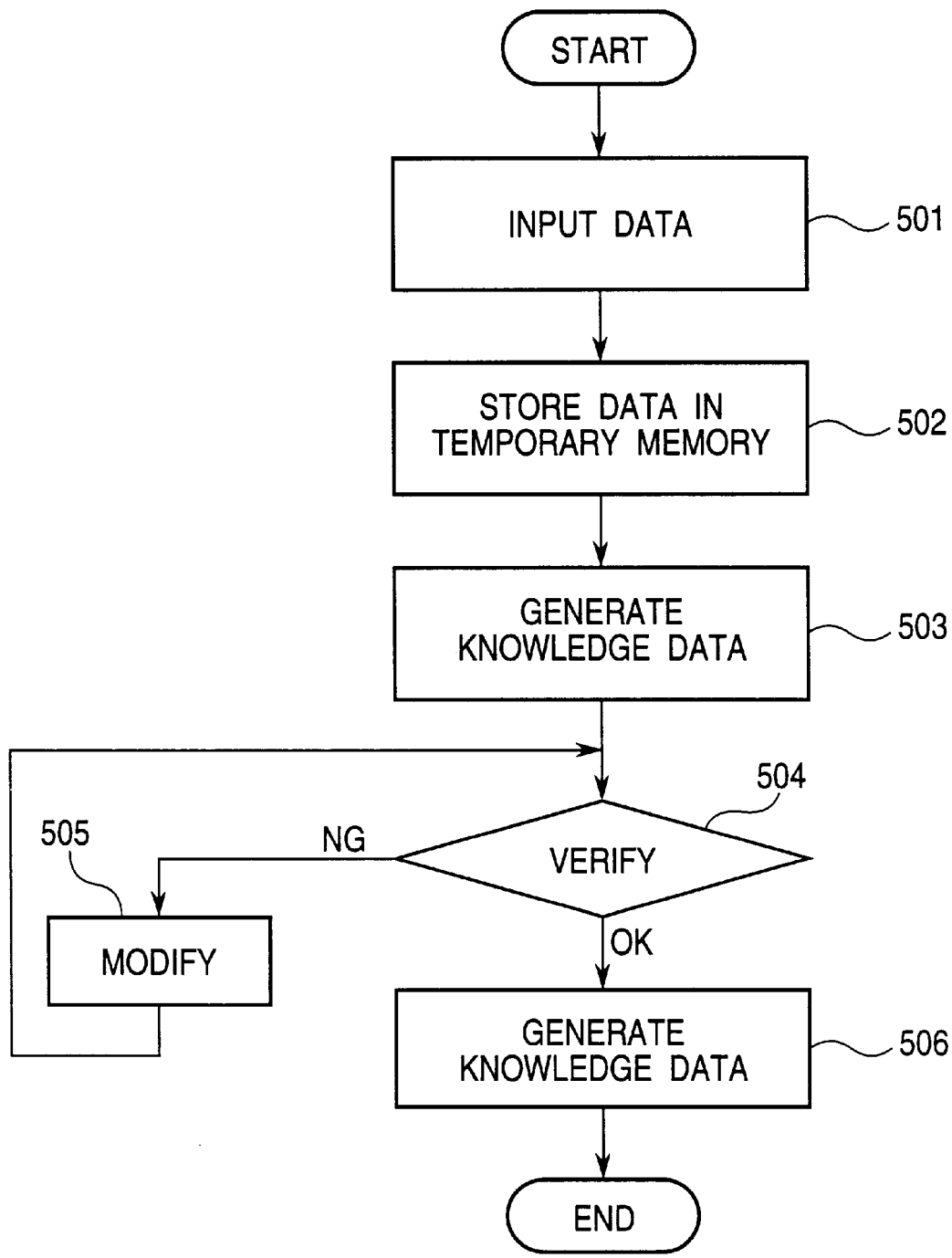
FIG. 5 is a flow chart for illustrating the overall operation of the first embodiment of the present invention.

Next, a flow of operation of the embodiment of the present invention will be described with respect to the flow chart of FIG. 5.

A designer preparing the process procedure inputs data by use of the input and display system 202 (step 501).

The inputted data is stored in the temporary memory 203 by action of the central processing system 201 (step 502).

Then, on the basis of the data stored in the product information memory 204 and the equipment information memory 205, the central processing system 201 generates the knowledge data, and stores the knowledge data in the knowledge data memory 206 (step 503).

Thereafter, the data stored in the temporary memory 203 is verified with reference to the knowledge data of the knowledge data memory 206, and if there is a problem, the content of the problem is displayed to the designer by the input and display system 202, and then is modified by the designer. Alternatively, the content of the problem and the content of the modification are displayed so as to be ascertained by the designer (steps 504 and 505).

If the result of verification indicates that there is no problem, the data stored in the temporary memory 203 is transferred to the product information memory 204 through the intermediary of the central processing system 201, so that it is put in a condition capable of producing the product (step 506).

Now, the processing of the knowledge data generation (step 503 in FIG. 5) and the processing of the verification (step 504 in FIG. 5) will be described.

FIGS. 6 and 7 illustrate one example of a knowledge data table prepared by using the product information memory 204 and the equipment information memory 205. The knowledge data table is stored in the knowledge data memory 206.

Referring to FIG. 6, a knowledge data table 601 is prepared on the basis of the process procedure data of the process procedure data base 302 stored in the product information memory 204. Table 601 stores what working process code exists next to each working process code. When it exists as the process next to the current process, "○" is marked, and when it does not exist as the process next to the current process, "×" is marked. When it can exist not only next to but also before the current process, "−" is marked. Furthermore, the condition code used in each working process code is stored in a final field of the knowledge data table 601. Namely, the knowledge data table 601 includes, for each entry of the current process codes, a field for storing a code indicating the possibility of the existence of succeeding or preceding processes, and a field for storing the use condition code.

Next, referring to FIG. 7, a knowledge data table 701 is prepared on the basis of the working history data of the working history data base 403 stored in the equipment information memory 205, and stores the number of uses of each equipment, obtained by counting the use of equipment.

This knowledge data table 701 includes, for each entry of the equipment group codes, a field for the count value indicating the number of uses of each equipment (identified by the equipment number) and a field for an adding number.

Figure 8:
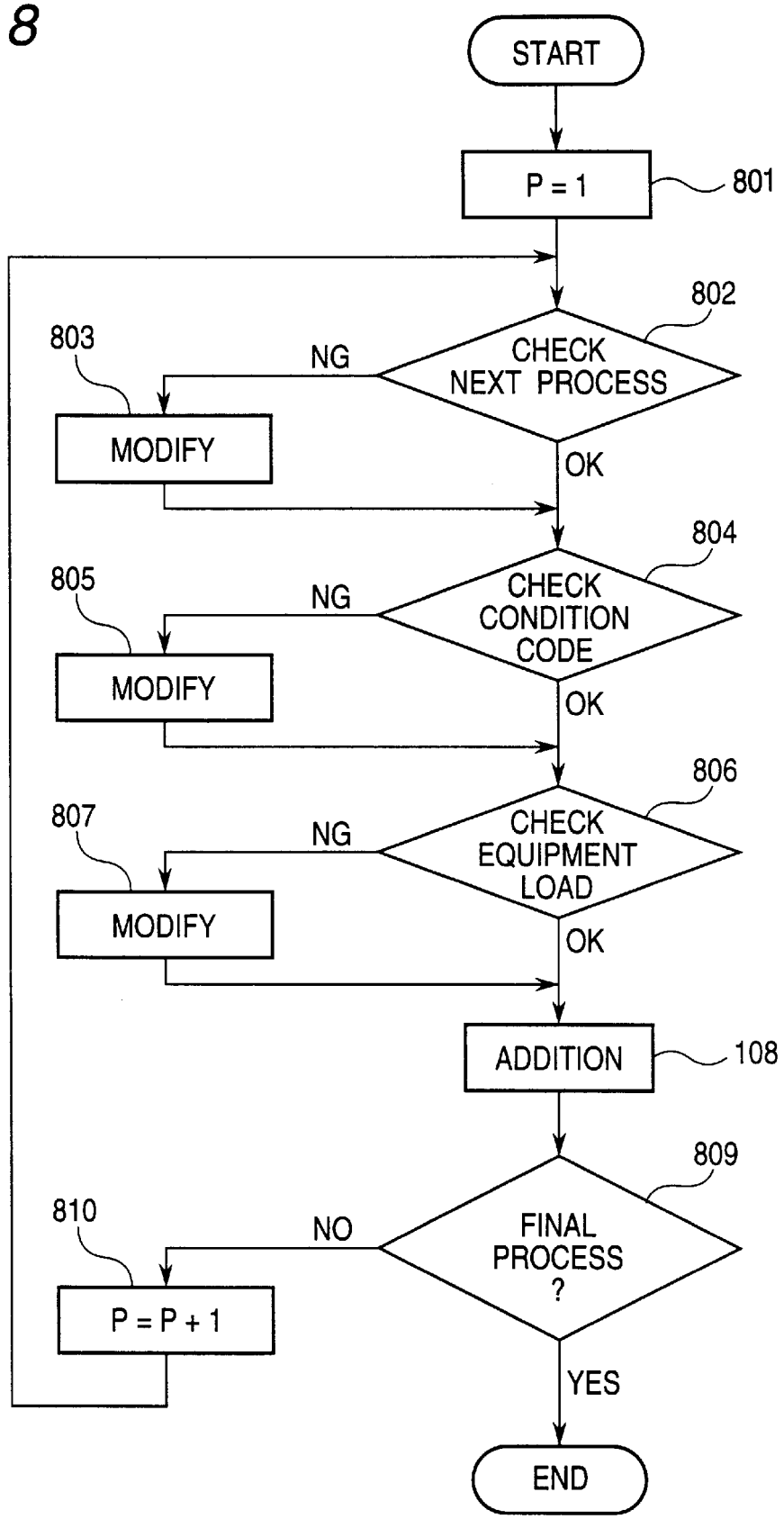
FIG. 8 is a flow chart for illustrating the processing of the process procedure verification and modification, in the first embodiment of the present invention.

FIG. 8 is a flow chart for illustrating the processing of the verification, in the embodiment of the present invention, using the above mentioned knowledge data.

Referring to FIG. 8, assuming that serial numbers are given to a first working process to a final working process of the process procedure to be verified, by giving "1" to the first working process, a pointer (P) for indicating the working process to be verified is set to "1" (step 801).

Then, attention is attracted to the working process indicated by the numerical value stored in the pointer, and how a correspondence between the code of the working process concerned and a next process code is stored in the knowledge data base 601, is checked.

If the field of the next process is "○" or "−", the verification goes to the next step 804. To the contrary, if it is "×", since there is possibility that the process exists before and after the working process concerned (namely, since there is problem), the verification goes into a modification processing (step 802).

In the modification processing, the process involving the problem and the next process are displayed by the input and display system 202 through the intermediary of the central processing system 201. In addition, by referring to the knowledge data base 601, working processes having the possibility existing as the process next to the process involving the problem, are also displayed.

If a plurality of processes are displayed, the designer selects one process from the plurality of processes, and returns the content of the selected process to the temporary memory 203 through the intermediary of the central processing system 201.

If one process is displayed, the designer checks the process, and returns the content of the process to the temporary memory 203 through the intermediary of the central processing system 201.

In the temporary memory 203, the working process is modified on the basis of the data returned through the intermediary of the central processing system 201 (step 803).

Next, attention is attracted to the condition code used in the working process concerned. There is checked whether or not the condition code concerned depends upon the use condition code(s) stored in the final field of the process code concerned stored in the knowledge data base 601. If it does not depend, the use condition code(s) is compared with the working content of various condition codes stored in the condition code data base 402 stored in the equipment information memory 205. If the working contents are the same, the verification goes into a next step. If there is nothing having the same content, the verification goes into a modification processing (step 804).

In the modification processing, the process involving the problem and the condition codes used in the process involving the problem, are displayed in the input and display system 202 through the intermediary of the central processing system 201. In addition, the use condition code(s) stored in the knowledge data base 601 is also displayed. At this time, if a plurality of condition codes are displayed, the designer selects one condition code from the plurality of condition codes, and returns the content of the selected condition code to the temporary memory 203 through the intermediary of the central processing system 201. If one condition code is displayed, the designer checks the condition code, and returns the content of the condition code to the temporary memory 203 through the intermediary of the central processing system 201. In the temporary memory 203, the condition code is modified on the basis of the returned data (step 805).

Figure 9:
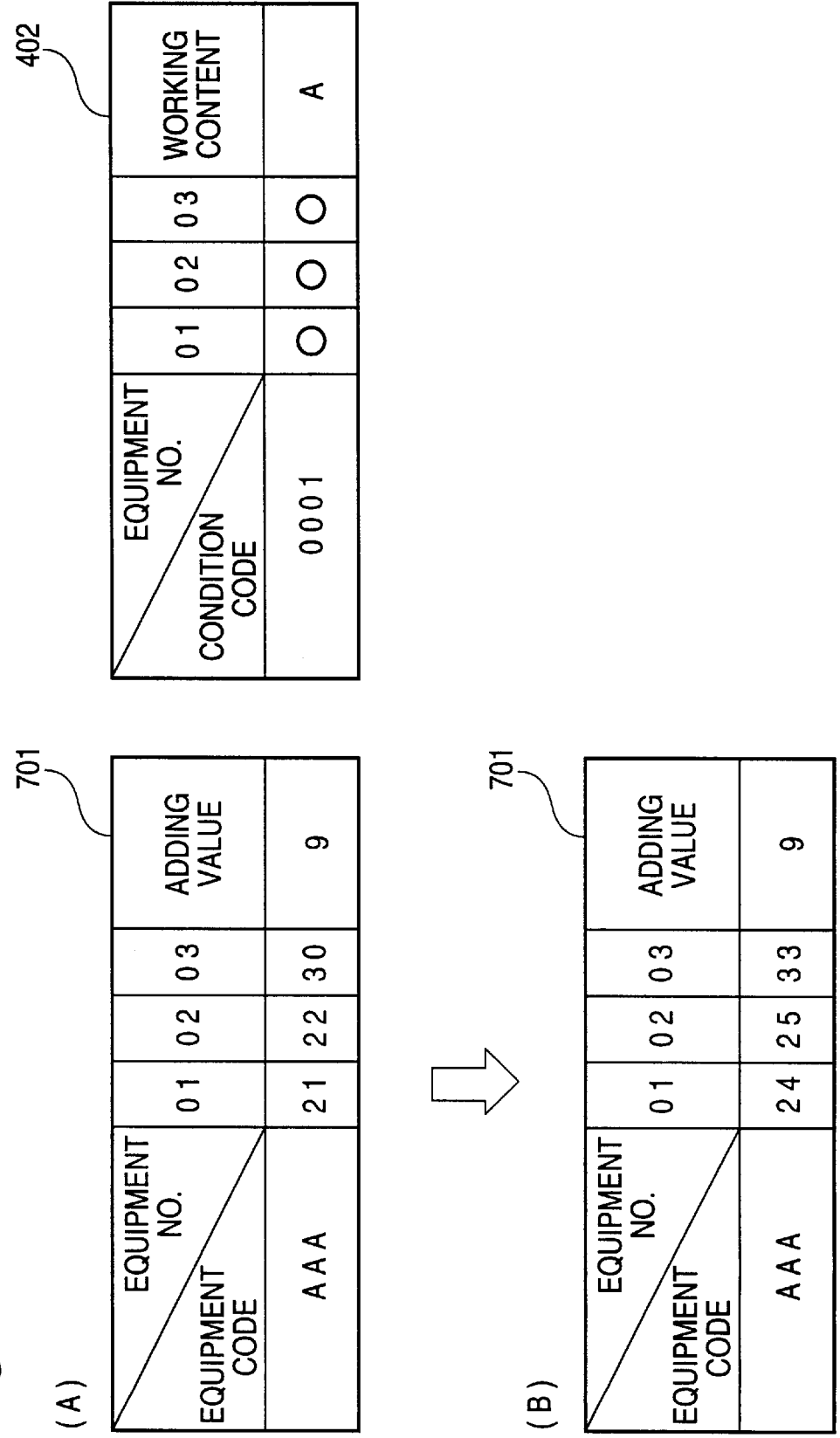
FIG. 9 illustrates one example of the knowledge data at the time of verifying the equipment load, in the first embodiment of the present invention.

Next, the equipment load is checked by using the equipment number of the equipment to be used determined by the condition code of the process concerned and the condition code data base 402 stored in the equipment information memory 205, and the equipment situation stored in the knowledge data base 701 (step 806). Now, the checking of the equipment load in this step 806 will be described with FIGS. 9 and 10.

In the case that the condition code of the working process concerned is "AAA0001", it is seen from the condition code data base 402 that "AAA0001" can be performed in the equipment of all the equipment numbers.

The use situation of each equipment included in the equipment group "AAA" is checked on the basis of the knowledge data base 701. As a result, it is discriminated that the difference in the use count value between the respective equipment (equipment Nos. 1 to 3) is not so large and is in a predetermined range (for example, the ratio of the minimum count value 21 to the maximum count value 30 is not larger than 1:1.5), and therefore, it is seen that the load is not concentrated into a limited equipment (See FIG. 9 (A)).

In this case, the condition code does not involve a problem, and is therefore not modified, and then, the respective count values are added with a value obtained by equally dividing the adding value. Namely, the respective values in the number-of-uses fields of the respective equipment numbers, are added with "3" obtained by dividing the adding value "9" by "3", so that the number of uses in the equipment Nos. 1 to 3 are changed to "24", "25, and "33", respectively (See FIG. 9(B)).

Referring to FIG. 10 as another case, assuming that the condition code of the working process concerned is "BBB0001", it is seen by a method similar to the above mentioned method that "BBB0001" can be performed in the equipment of all the equipment numbers.

Next, in method similar to the above mentioned method, the use situation of "BBB" is checked. As a result, it is considered that the load of the equipment No. 01 is large and exceeds the predetermined range. In other words, it is discriminated that the load of a limited equipment is large. In this case, in order to ensure that the working is not performed in the equipment No. 01, namely, in order to perform the working by only the equipment Nos. 02 and 03, the condition code is changed from "BBB0001" to "BBB0003 (See the condition code "0003" in the condition code data base 402 in FIG. 10).

In addition, the equipment Nos. 02 and 03 are added by a value obtained by equally dividing the adding value (See FIG. 10(B)).

Thus, returning to FIG. 8 the load is checked and modified (steps 806 to 808).

Thereafter, whether or not the working process concerned is a final process, is discriminated (step 809). If the working process concerned is not the final process, the pointer is incremented (step 810) and the above mentioned processing is repeated.

Figure 11:
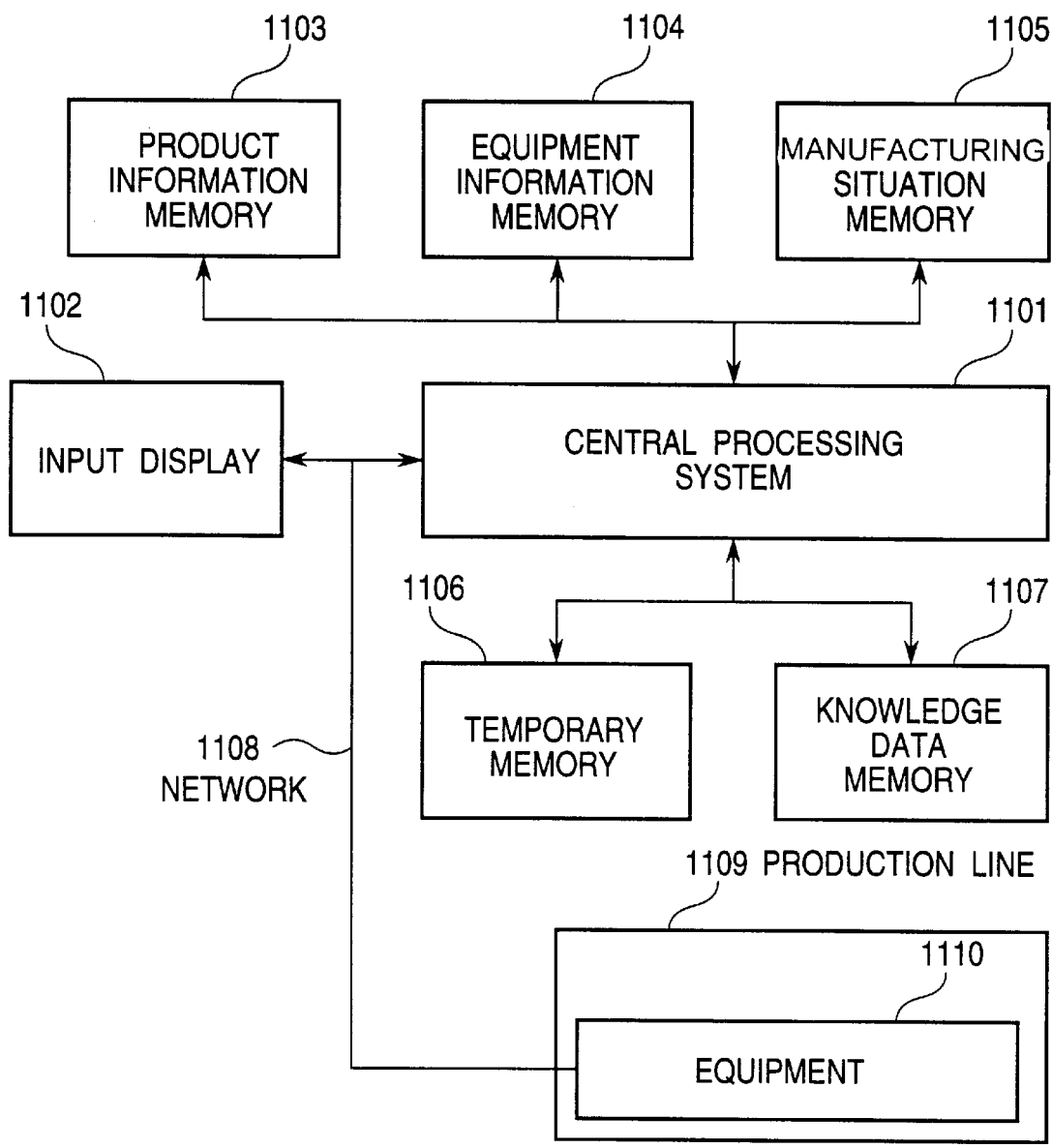
FIG. 11 is a block diagram illustrating the construction of a second embodiment of the present invention.

FIG. 11 is a block diagram illustrating the construction of a second embodiment of the present invention.

Referring to FIG. 11, the second embodiment includes a central processing system 1101, an input and display system 1102 for inputting and displaying various information, a temporary memory 1106 for temporarily moving and storing a process procedure involving a problem, a product information memory 1103 for storing a working procedure and a working condition for each product, an equipment information memory 1104 for storing the number of pieces of equipments and the working history of the equipment, a manufacturing situation memory 1105 for storing the working situation of each product, and a knowledge data memory 1107 for storing the knowledge data obtained from the above mentioned memories. The input and display system 1102, the temporary memory 1106, the product information memory 1103, the equipment information memory 1104, the manufacturing situation memory 1105 and the knowledge data memory 1107 for storing the knowledge data obtained from the above mentioned memories, are connected to the central processing system 1101.

The central processing system 1101 is connected through a network 1108 to a semiconductor device manufacturing equipment 1110 provided in a production line 1109, and sequentially transmits product processing information through the network 1108.

Figure 12:
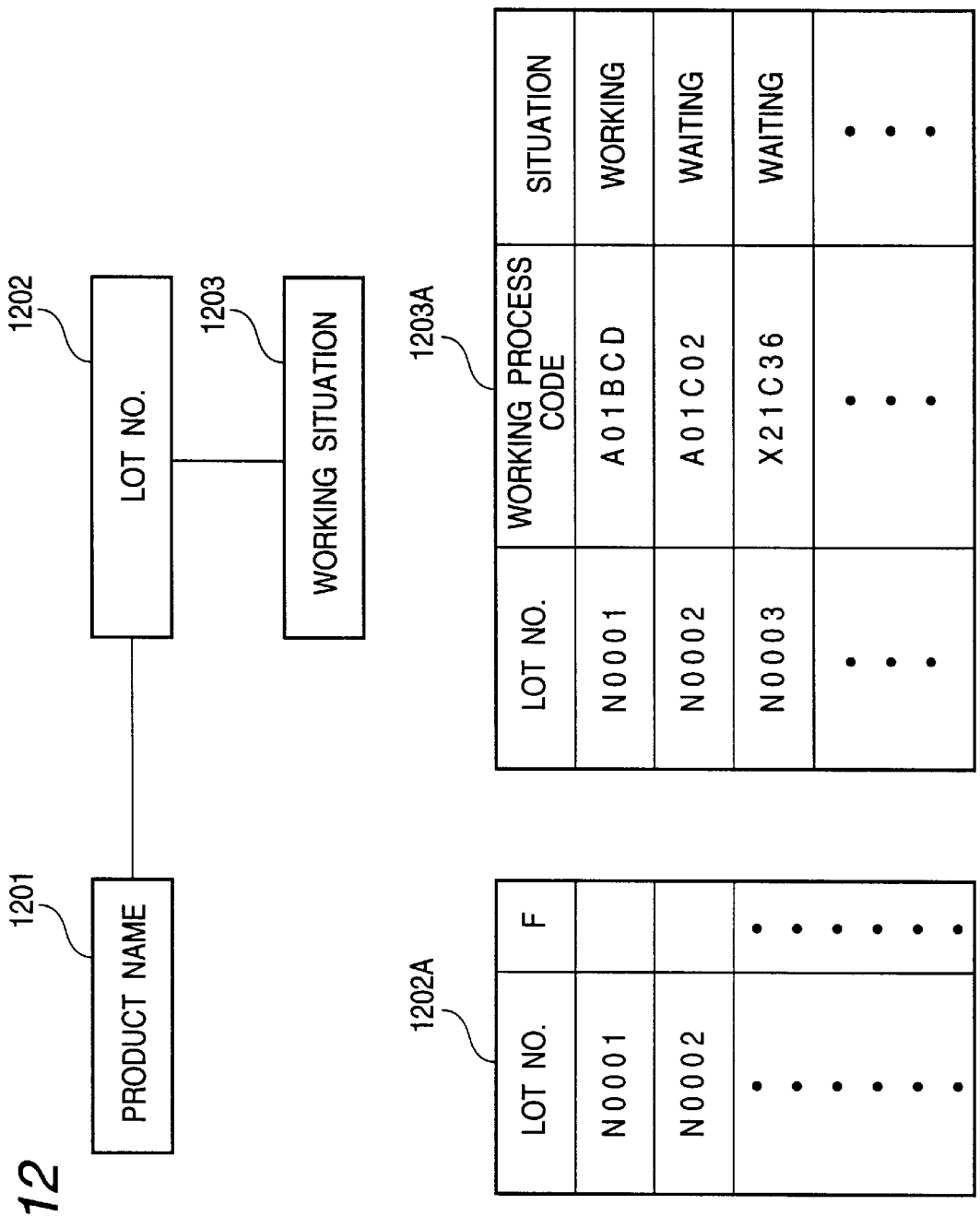
FIG. 12 illustrates one example of the data structure in a manufacturing situation memory in the second embodiment of the present invention.

FIG. 12 illustrates one example of the structure of information stored in the manufacturing situation memory 1105.

In the manufacturing situation memory 1105, the product data base 1201 storing the product name of the product being manufactured in the manufacturing line 1109 is linked with a lot number data base 1202, 1202A storing the lot number in a work-in-progress condition of each product which has already started to be manufactured. The lot number data base 1202 is linked to a working situation data base 1203, 1203A storing the working situation of each lot.

Figure 13:
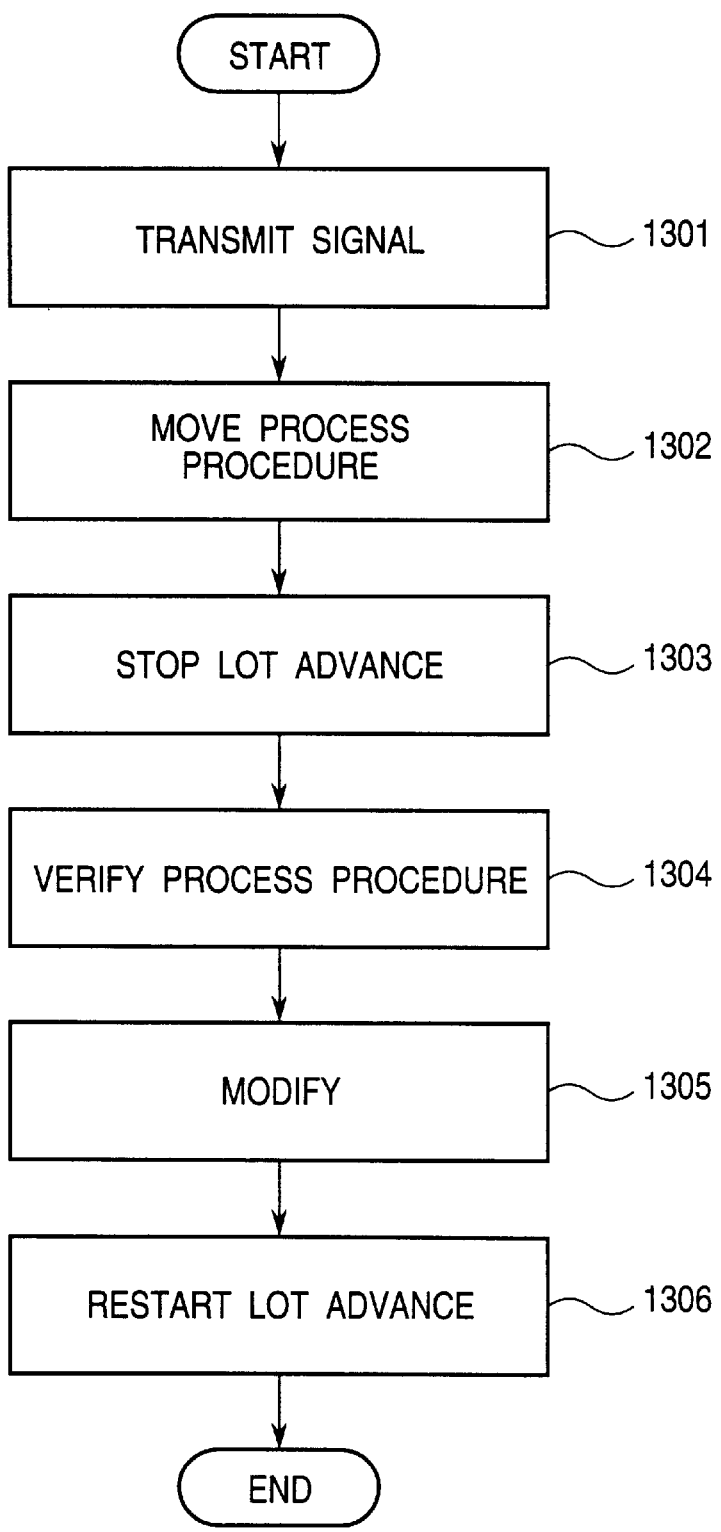
FIG. 13 is a flow chart for illustrating the overall operation of the second embodiment of the present invention.

Now, an operation of the second embodiment of the present invention will be described with reference to a flow chart of FIG. 13.

A signal indicating that for example a contamination trouble has occurred in the production line 1109, is transmitted to the central processing system 1101 through the network 1108 (step 1301).

Then, the process procedure of the product in which contamination trouble has occurred, is moved from the product information memory 1103 to the temporary memory 1106 (step 1302).

Thereafter, a flag is stood in the lot number data base 1202 of the problematic product. If the flag is stood, even if it is requested to perform the working in the equipment 1110, the equipment does not acknowledge the request, and therefore, the working can no longer advance (step 1303).

Next, the problematic process procedure is checked, and a portion having a problem is modified (steps 1304 and 1305).

After the modification is completed, the process procedure in the temporary memory 1106 is returned to the product information memory 1103, and the flag standing in the lot number data base 1201 is removed, and the lot advancement is caused to restart (step 1306).

As mentioned above, according to the present invention, in the method for verifying the process procedure includes, the knowledge data is generated on the basis of the process procedure being currently used, and the verification is executed by using the knowledge data. Therefore, in comparison with the process verification made by a human being, a constant stable verification result can be always obtained with no intervention of the experience difference and the perception of a human being.

Furthermore, since the verification can be performed immediately after the process procedure data is inputted, it is possible to shorten the time from the preparation of the process procedure to the actual start of the production.

In another advantage of the present invention, since the equipment load is calculated on the basis of the actual working history and the work is distributed over the working equipment on the basis of the result of calculation, a load is never concentrated onto a limited equipment, and therefore, the production can be performed efficiently.

Furthermore, according to the present invention, when an accident such as a contamination trouble has occurred in the production line, the advancement of the work concerning the problematic product is stopped, and after the modification is completed, the advancement of the working in the lot in question is restarted. As a result, enlargement of the accident is prevented, and the manufacturing reliability of the production line is elevated.

What is claimed is:

1. A process procedure verifying system comprising:
    means for storing information data concerning the process procedure and the working conditions of a product being manufactured in a production line;
    means for generating, on the basis of the stored information data, a knowledge data for verifying a process procedure;
    means for verifying a process procedure prepared by using the stored condition in said production line, this means checking a load of each of the equipment groups in said production line; and
    means for modifying a problem in said process procedure, on the basis of the verification result and said knowledge data.

2. In a system for manufacturing a product by performing a plurality of predetermined processes in accordance with a predetermined flow, the system comprising:
    means for storing equipment information including the working situation and the capability of equipment in a production line;
    means for storing product information including the working situation of a product, the work-in-process situation, and the process procedure and the working condition of the product being manufactured in the production line, and
    means for controlling the product being manufactured in the production line, by using these storing means,
    wherein a process procedure verifying system comprises:
    means for generating a knowledge data, this verifying means checking a load of each equipment included said production line by using said process procedure and said working condition stored in said means for storing the product information;
    input means for inputting product information including the process procedure and the working condition;
    temporary storing means for temporarily storing data inputted through said input means;
    verifying means for verifying newly inputted data on the basis of said temporary storing means and said knowledge data generated by said means for generating the knowledge data;
    modifying means for retrieving a problem on the basis of the result of the verification performed by said verifying means and for modifying the found-out problem;
    means for temporarily storing the modified data; and
    means for transferring the modified data to said means for storing the production information.

3. A process procedure verifying system claimed in claim 2 further including:
    means for retrieving, when there occurs a problem attributable to the data included in the product information, the data included in the product information and concerning a problematic product, by using said knowledge data, in order to find out the problem;
    means for retrieving data in all the information, by using the found-out problem as a key;
    means for stopping the progress of the working concerning the product which has been considered to be problematic from the result of said retrieval; and
    means for restarting the progress of the working of the product which was stopped, after the found-out problem is removed.

4. A method for verifying a process procedure comprising the steps of:
    storing process data concerning the process procedure and storing condition data concerning working conditions of a product being manufactured in a production line;
    generating, on the basis of the stored process and condition data, knowledge data for verifying the process procedure;
    storing equipment data related to condition of equipment groups in the production line;
    verifying the process procedure using the equipment data, this verifying step including checking a load of each equipment in the production line; and
    modifying a problem in the process procedure in response to a result of the verifying step and in response to the knowledge data.

5. In a system for manufacturing a product by performing a plurality of predetermined processes in accordance with a predetermined flow, a method for verifying a process procedure comprising the steps of:
    storing equipment information including a working situation of equipment in a production line and a capability of the equipment;
    storing the product information including the process procedure and a working condition associated with the product;
    generating knowledge data using the stored process procedure and the stored product information;
    inputting new product information;
    temporarily storing the new product information;
    verifying the new product data using the knowledge data, this verifying step including checking a load of each equipment in the said production line;

identifying a problem in response to a result of the verifying step modifying the new product information in response to the identified problem;

updating the stored product information in response to the modified new product data; and controlling a manufacture of the product in response to the updated stored product information.

6. The method as recited in claim 5 further including the steps of:

during the manufacture of the product, retrieving the stored product information when a manufacturing problem occurs;

identifying the manufacturing problem using the knowledge data;

retrieving other stored information using the identified manufacturing problem as a key;

stopping the manufacturing of the product in response to a result of the retrieval; and restarting the manufacturing of the product after the manufacturing problem is removed.

7. A process procedure verifying system comprising:

a product information memory storing product information including the process procedure and equipment required for manufacturing a product in a production line;

equipment information memory storing equipment information including a condition of equipment in the production line; and a central processing system coupled to the product information memory and coupled to the equipment information memory, the central processing system generating knowledge data using the stored equipment information and the stored product information, verifying the process procedure using the stored equipment information, this verifying step including checking a load of each equipment in the production line, and modifying the process procedure in response to a result the verifying and in response to the knowledge data.

8. A system for manufacturing a product by performing a plurality of predetermined processes in accordance with a process procedure comprising:

equipment for performing the predetermined processes;

equipment information memory storing equipment information including a capability of the equipment and a current utilization of the equipment;

an input device receiving original product information including the process procedure and an identification of equipment required to manufacture the product, and receiving new product information including at least a new process procedure;

a product information memory coupled to the input device and storing the product information;

a temporary memory coupled to the input device and storing the new product information;

a manufacturing situation memory storing the manufacturing status of a product; and a central processing system coupled to the product information memory, the equipment information memory, the manufacturing information memory, the input device, the display device and the equipment, the central processing system:

generating knowledge data using the stored product information, verifying the new process procedure stored in the temporary memory in response to the knowledge data, this verifying step including checking a load of each equipment in the production line, identifying a problem in the new process procedure in response a result of the verifying, modifying the new process procedure in response to the identified problem, updating the process procedure stored in the product information memory in response to the modified new process procedure, and controlling the equipment to manufacture the product in response to the updated process procedure.

9. The system of claim 8, wherein the central processing system further:

during the manufacture of the product, retrieving the stored product information when a manufacturing problem occurs;

identifying the manufacturing problem using the knowledge data;

retrieving other stored information using the identified manufacturing problem as a key;

stopping the manufacturing of the product in response to a result of the retrieval; and restarting the manufacturing of the product after the manufacturing problem is removed.

* * * * *